United States Patent [19]

Jackson

[11] 4,034,999
[45] July 12, 1977

[54] ADJUSTABLE TOP LINK FOR 3-POINT HITCH

[75] Inventor: Carl D. Jackson, Pendleton, Ind.

[73] Assignee: Royal Industries, Inc., Sac City, Iowa

[21] Appl. No.: 657,450

[22] Filed: Feb. 12, 1976

[51] Int. Cl.² .......................................... B60D 1/16
[52] U.S. Cl. ............................ 280/461 A; 280/482
[58] Field of Search .......... 280/482, 461 A, 460 A, 280/478 R; 172/272, 448, 449, 439; 74/424.8 A

[56] References Cited

U.S. PATENT DOCUMENTS

| | | | |
|---|---|---|---|
| 2,001,058 | 5/1935 | Fellay | 74/424.8 A |
| 3,157,416 | 11/1964 | Sandbakken | 280/482 X |
| 3,889,980 | 6/1975 | Geisthoff | 280/461 A |

Primary Examiner—Philip Goodman
Assistant Examiner—R. Schrecengost
Attorney, Agent, or Firm—Wegner, Stellman, McCord, Wiles & Wood

[57] ABSTRACT

For use in a 3-point hitch for a tractor or the like wherein there is provided a top link of variable length and a pair of powered lift arms, an improved top link including an elongated threaded rod, a connector for securing the rod to either a tractor or an implement, and a nut structure threaded on the rod. A connector is provided for securing the nut structure to the other of the tractor or the implement and the nut structure is split so that it may move radially relative to the rod to engage or disengage the same. An actuator is provided for selectively effecting the relative movement or precluding the relative movement and may be operated to allow the relative radial movement of the nut relative to the rod to disengage the same from the rod whereby the rod may be moved axially relative to the nut without rotation to rapidly adjust the link to a desired length. Relative movement of the nut toward the rod to engage the same may then be effected to maintain the link at the desired length.

11 Claims, 10 Drawing Figures

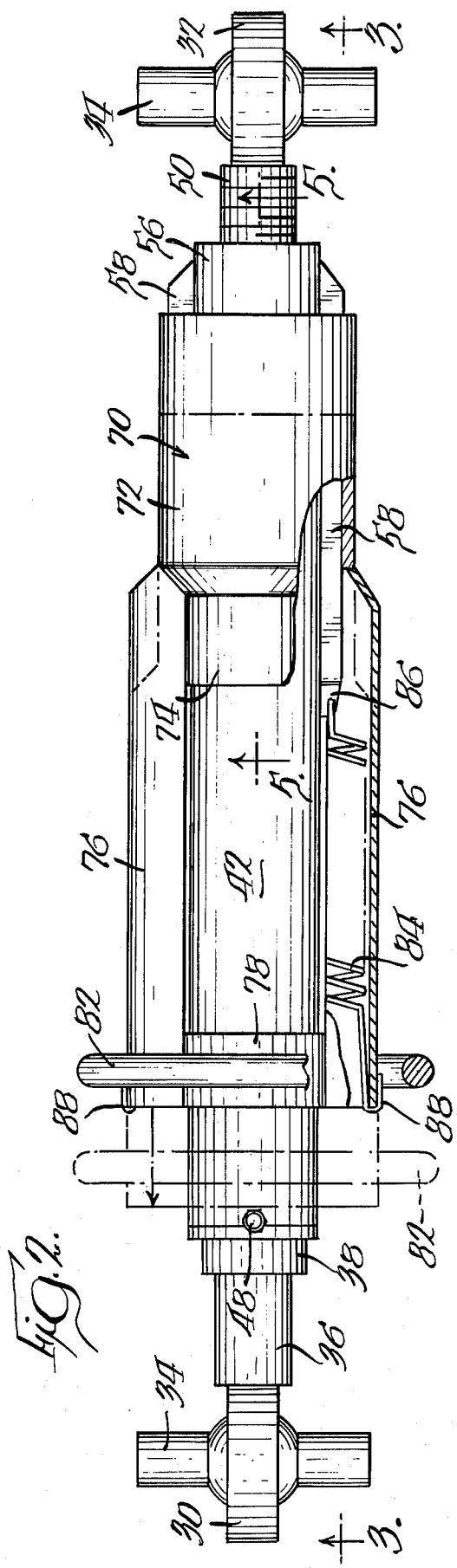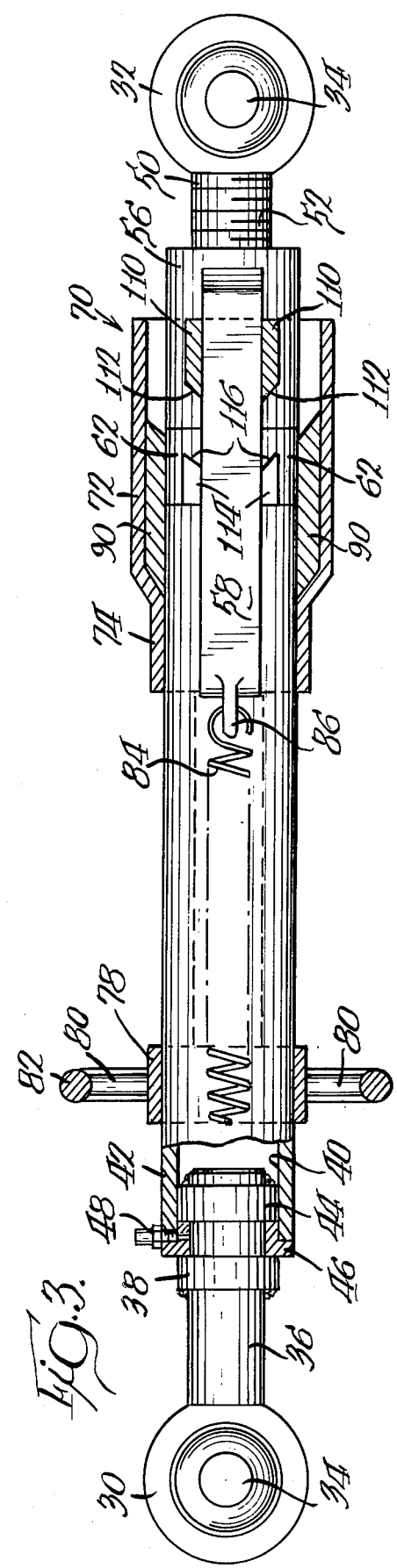

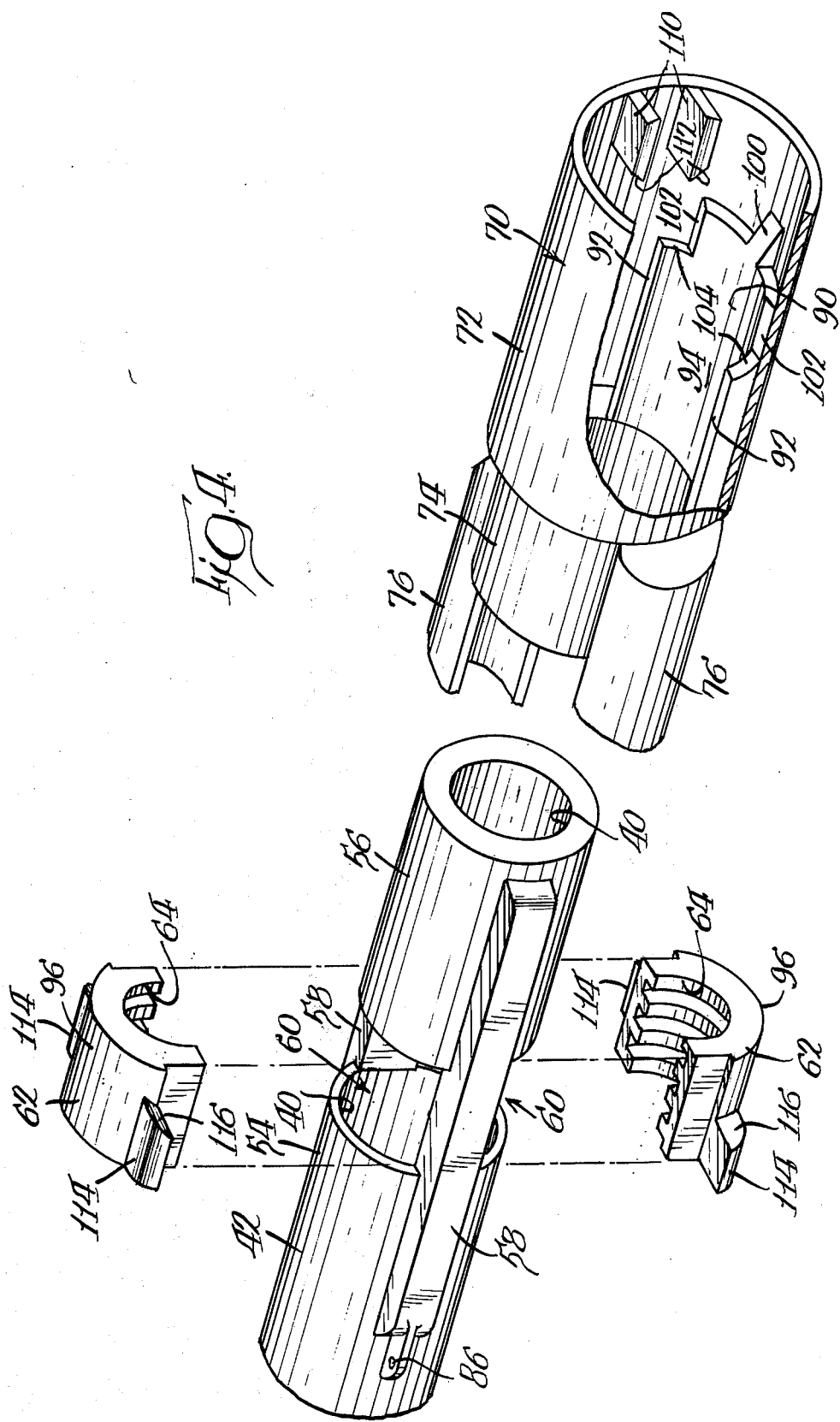

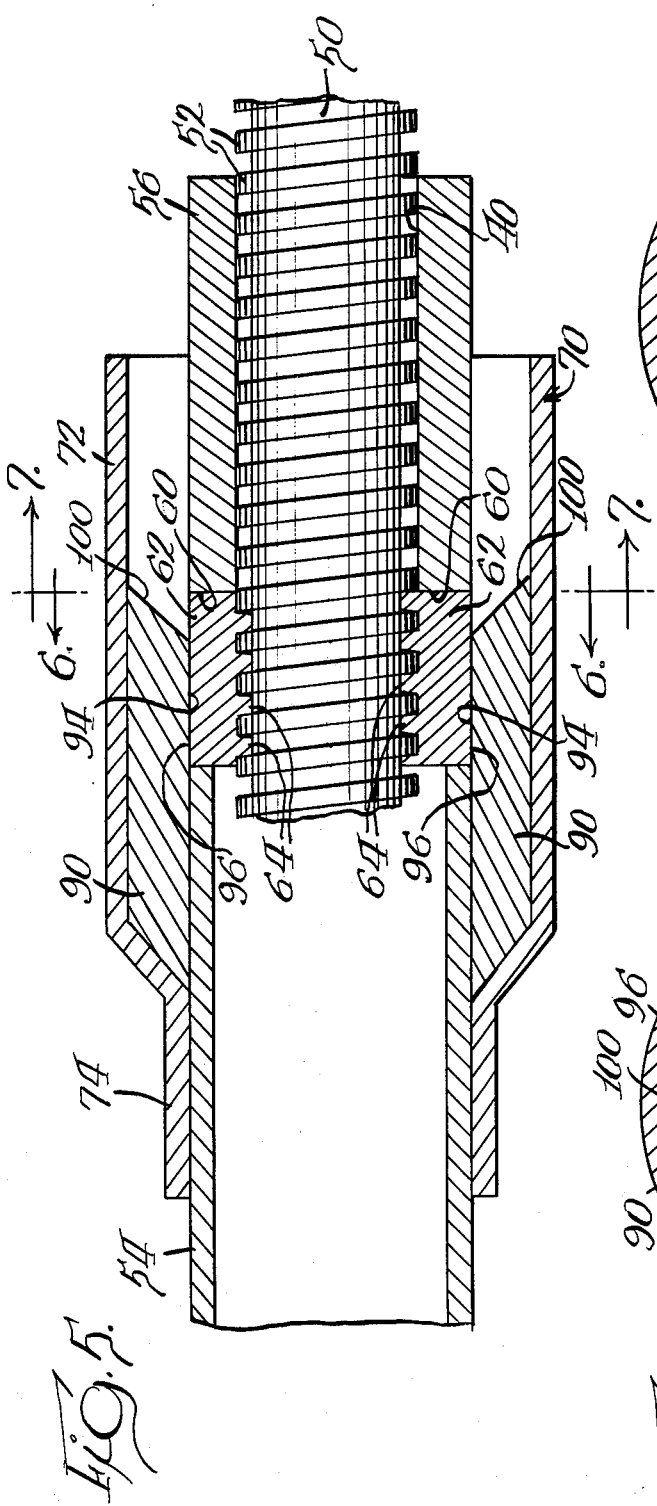
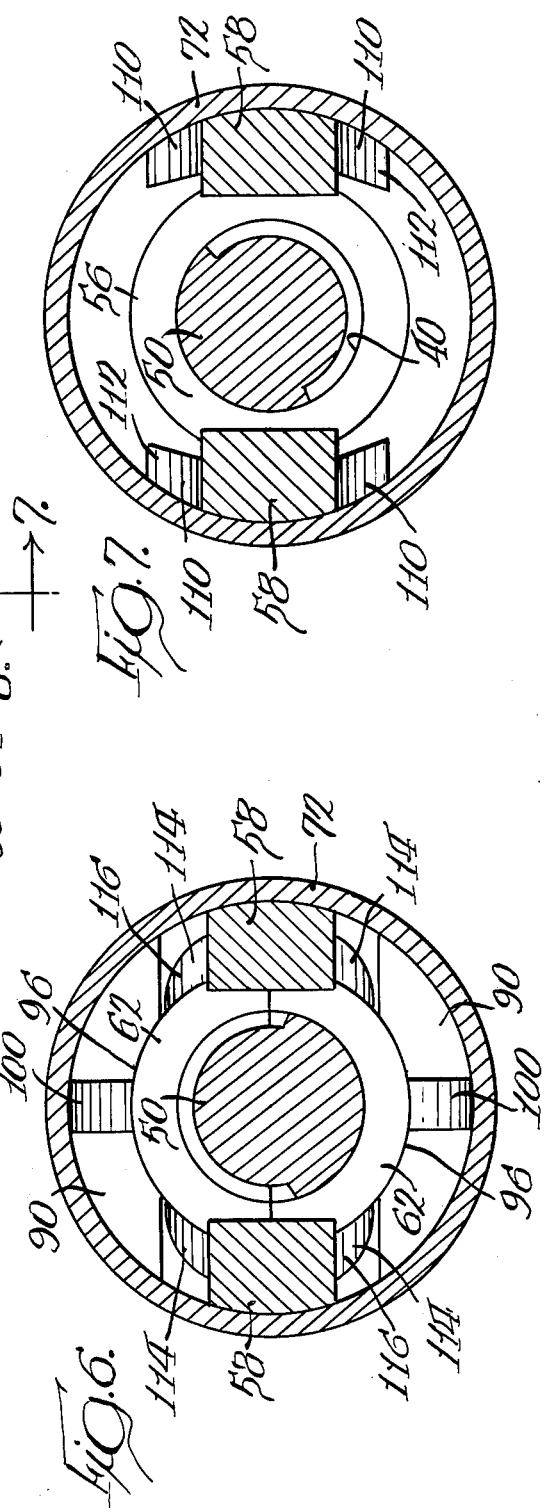

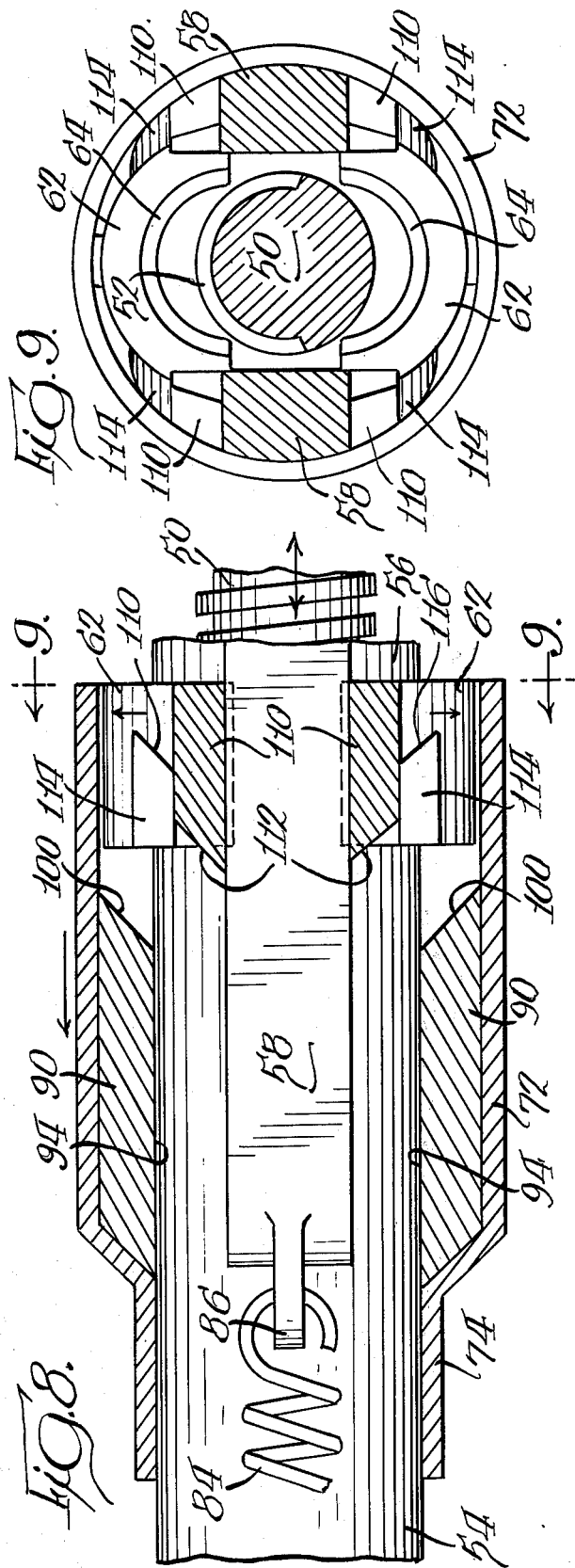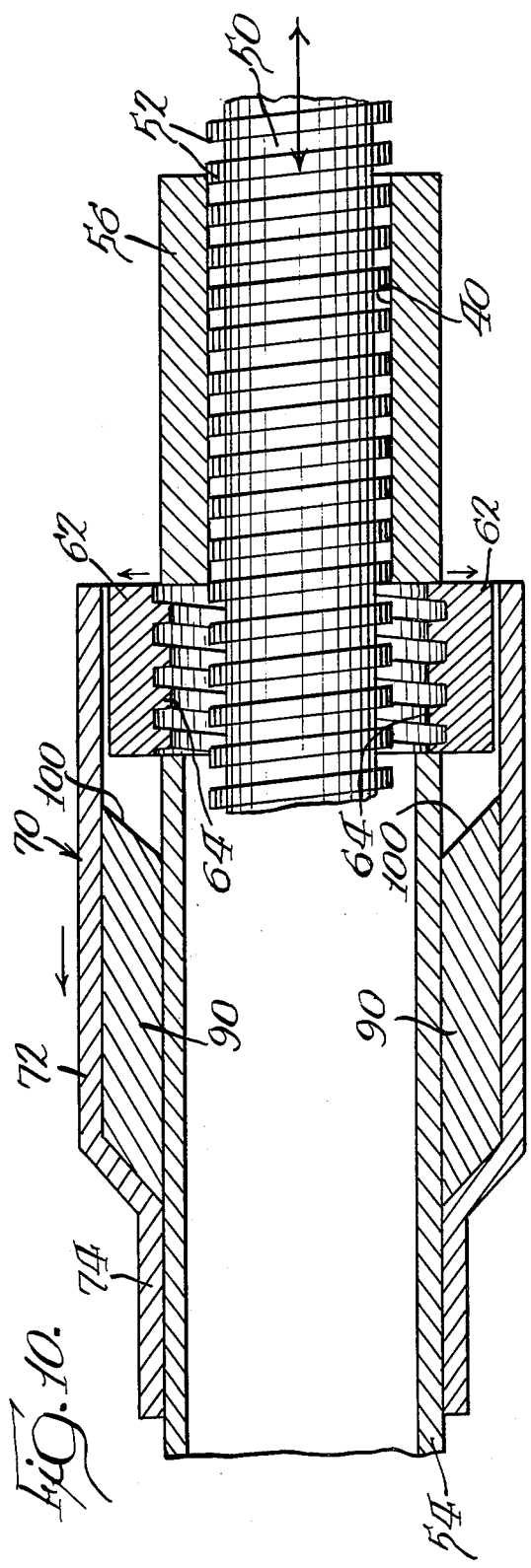

ADJUSTABLE TOP LINK FOR 3-POINT HITCH

BACKGROUND OF THE INVENTION

This invention relates to 3-point hitches for tractors or the like. More specifically, it relates to adjustable links, such as an adjustable top link employed in such hitches.

The spacing between the three points of attachment on an implement to be joined to a 3-point hitch on a tractor varies widely depending upon the nature of the implement, the manufacturer of the implement, the capacity of the 3-point hitch and the manufacturer of the tractor having the hitch. As a consequence, it has been necessary to provide a means whereby the hitch may be adjusted to accommodate the differences in implements.

Typically, the adjustment has been achieved by means of an adjustable top link in the hitch. Heretofore, such links have been formed as what may be termed an oversized turnbuckle, frequently having the capability of having its overall length varied by 12 inches or more. When extreme changes in the length of the link have been necessary, the adjustment process has been extremely time consuming. For example, if the threaded rod employed in such a link has 7 threads per inch and a change in length of 10 inches is necessary, 70 revolutions of the components of the link are required to achieve the adjustment.

In order to minimize the effort required, the prior art has employed ratchet devices in connection with the sleeves of such links. This approach, while an improvement, still requires significant effort.

Another approach has been to provide the sleeve of the link with an enlarged circular handle, frequently 12 inches in diameter or more in a plane transverse to the length of the sleeve to improve the leverage and thereby minimize the amount of force required to effect rotation and thus adjustment. Again, such means represent an improvement but, nonetheless, significant time is consumed in effecting adjustment.

SUMMARY OF THE INVENTION

It is the principal object of the invention to provide a new and improved adjustble link for use in 3-point hitches. More specifically, it is an object of the invention to provide such a link wherein the length of the link may be rapidly changed to any desired length with a minimum of effort.

An exemplary embodiment of the invention achieves the foregoing object in a link including an elongated threaded rod, means for securing the rod to either a tractor or an implement, a nut structure threaded on the rod, and means for securing the nut structure to the other of the tractor or the implement. One of the nut structure and the rod are split so that relative radial movement may be effected to selectively engage or disengage the rod and the nut structure. Means are provided for selectively effecting the relative radial movement so that the rod and the nut may be disengaged to allow relative axial movement between the rod and the nut structure to occur without turning the nut structure until a desired length is attained and then further operated to re-engage the rod and the nut structure to maintain the link at the desired length. An exemplary embodiment of the invention contemplates the further provision of a means for precluding the relative radial movement to ensure positive maintenance of the desired length.

In a preferred embodiment of the invention, the nut structure includes a split nut having segments movable toward and away from the rod.

In a highly preferred embodiment of the invention, the means for effecting and precluding the relative radial movement include cam means, as, for example, first and second cam surfaces.

In a preferred embodiment, the link includes an elongated tubular sleeve having a bore and the threaded rod is disposed, slidably, within the bore. At least one radially directed opening is located in the sleeve and extends to the bore and the nut structure is disposed in the opening for radial movement between positions engaging the rod and disengaged from the rod.

The cams may be carried by a collar, which also is configured to house the nut. The collar is reciprocally mounted on the sleeve for movement between positions effecting operation of the cams and means are provided for biasing the collar towards a position wherein relative radial outward movement of the nut or threaded element away from engagement with the rod is precluded.

Other objects and advantages will become apparent from the following specification taken in connection with the accompanying drawings.

DESCRIPTION OF THE DRAWINGS

FIG. 2 is an elevation of the adjustable link with parts broken away for clarity;

FIG. 3 is a sectional view taken approximately along the line 3—3 of FIG. 2;

FIG. 4 is an exploded view of a portion of the link with parts broken away for clarity;

FIG. 5 is an enlarged, fragmentary sectional view taken approximately along the line 5—5 of FIG. 2;

FIG. 6 is a sectional view taken approximately along the line 6—6 of FIG. 5;

FIG. 7 is a sectional view taken approximately along the line 7—7 of FIG. 5;

FIG. 8 is an enlarged, fragmentary sectional view of a portion of a split nut structure and associated cam employed in the invention;

FIG. 9 is a sectional view taken approximately along the line 9—9 of FIG. 8; and FIG. 10 is a sectional view similar to that of FIG. 8 illustrating the split nut structure disengaged from a threaded rod.

DESCRIPTION OF THE PREFERRED EMBODIMENT

Figure 1:
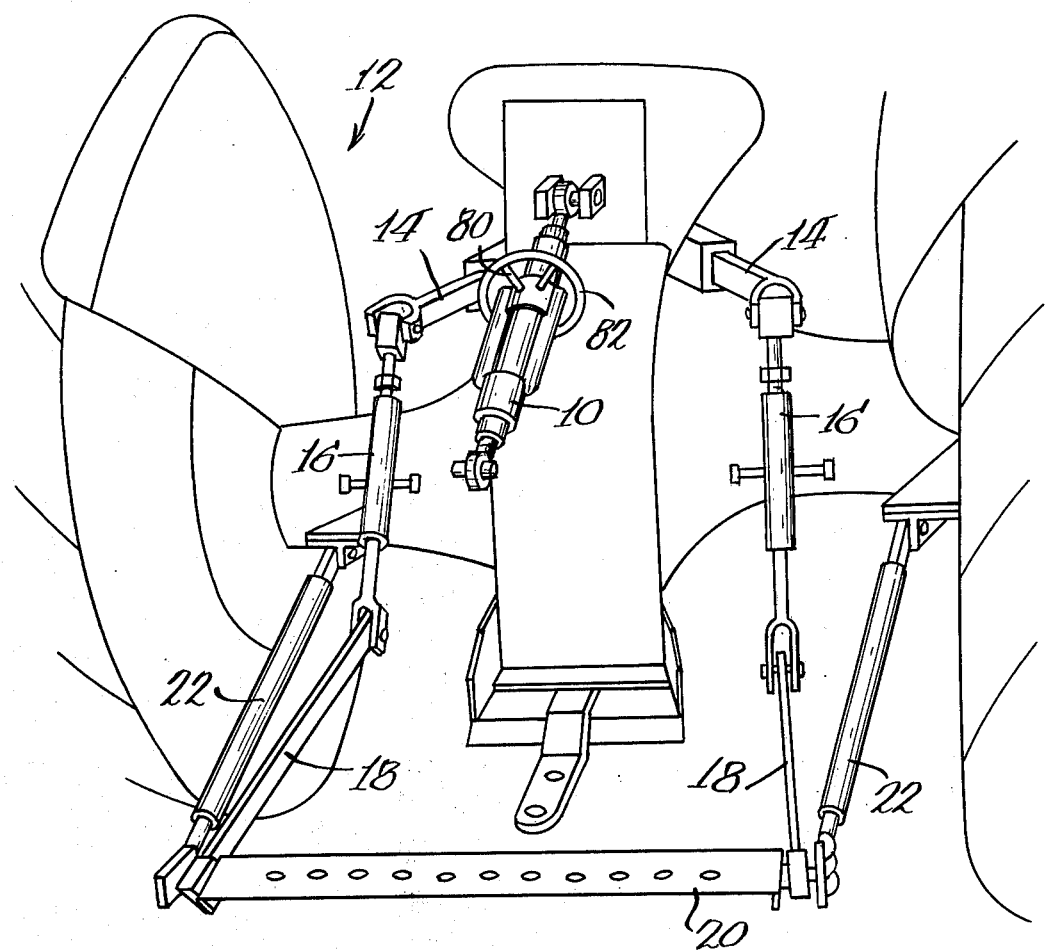
FIG. 1 is a fragmentary perspective view of a portion of a tractor including a 3-point hitch embodying an adjustable link made according to the invention.

An exemplary embodiment of an adjustable link made according to the invention is illustrated in FIG. 1 as forming a top link 10 in a 3-point hitch mounted on the rear of a tractor, generally designated 12. The 3-point hitch includes lift arms 14 which typically are powered by hydraulic cylinders (not shown). If desired, side links 16 may be secured to the lift arms 14 for pivotal movement relative thereto and are connected by links 18 to an implement (not shown) or to other structure as, for example, the drawbar designated 20. Stabilizing links 22 suitably secured to the tractor 12 are also provided.

As illustrated in FIG. 1, the top link 10 is not being employed in connection with the mounting of the drawbar 20. However, as is well known, the top link 10 will typically be connected to an implement or the like when the implement is secured to the lift arms 14 or links, such as the side links 16.

Referring now to FIGS. 2 and 3, the adjustable link is provided with first and second connectors 30 and 32 at its opposite ends in the form of conventional ball sockets for receipt of pins 34 whereby one of the connectors 30 and 32 may be secured to a clevis or the like on the tractor 12 and the other to similar structure on an implement. The first connector 30 is secured as by welding to a stub shaft 36 provided with an annular stop 38. The shaft 36 extends beyond the stop 38 into the interior bore 40 of an elongated sleeve 42 to receive a second stop 44.

The end of the sleeve 42 is provided with a collar 46 having an interior bore of a diameter just slightly larger than that of the stub shaft 36 and less than the diameter of the stops 38 and 44 so that a thrust bearing is defined whereby the first connector 30 is rotatably secured to one end of the sleeve 42. A lubrication fitting 48 is removably disposed at the thrust bearing defined by the stops 38 and 44 and the collar 46 to lubricate the same. As will be seen, the lubrication fitting 48 also serves as a stop to prevent inadvertent disassembly of other components of the adjustable link.

The second connector 34 is secured by any suitable means to an elongated rod 50 provided with a plurality of latching formations along its length in the form of a continuous thread 52. The rod 50 extends into the bore 40 of the sleeve 42, generally to a point of adjacency to the right-hand end of the stub shaft 36 as viewed in FIG. 3. It is to be noted that the arrangement is such that the rod 50 is freely slidable within the bore 40.

As best seen in FIG. 4, the sleeve 42 is formed of two tubular segments 54 and 56 joined together by axially extending pieces of bar stock 58 in spaced relation to define opposed, radially extending openings 60 which extend to the bore 40. The tubular elements 54 and 56 have the same outer diameter, while the tubular element 56 has an inner diameter just slightly greater than that of the rod 50 so that the rod 50 may freely slide therein without skewing appreciably relative to the longitudinal axis of the assemblage. Since the tubular element 56 is sufficient to prevent such undesirable skewing, the tubular element 54 may be formed of a relatively thin walled stock to minimize expense without sacrificing structural rigidity.

Each of the openings 60 receives a latching element in the form of a split nut 62. Each split nut has a threaded surface 64 having an arcuate extent of about 180° and adapted to mesh with the threads 52 on the rod 50. The split nuts 62 are movable within the opening 60 in a radial direction relative to the rod 50 between a position wherein they threadably engage the threads 52 on the rod 50 and a position whereat they are disengaged from the rod 50. In the latter position, the rod 50 will be freely axially movable without rotation relative to the assemblage to rapidly achieve a coarse adjustment of the overall length of the link.

Means are provided for precluding such relative radial movement between the split nut 62 and the rod 50. Means are also provided for selectively effecting such relative radial movement.

In the exemplary embodiment, the means for precluding movement and the means for effecting the movement include cam means carried by a collar 70 mounted for reciprocal movement on the sleeve 42 between the solid and dotted line positions illustrated in FIG. 2. The collar 70 includes a housing end 72 of relatively large diameter joined to a guide 74 of lesser diameter. The guide 74 has an internal diameter just slightly greater than that of the sleeve 42, while the housing 72 has a larger internal diameter which is sufficient to permit the split nuts 62 to be moved radially outwardly relative to the rod 50 sufficient to be disengaged from the rod in order to permit rapid axial adjustment as mentioned previously.

The guide 74 has two, opposed, axial slots (not shown) sized to receive the bar stock elements 58. The slots are covered by semi-cylindrical, elongated struts 76 which encompass the bar stock elements 58 and extend away from the housing 72 to ring 78 slidably mounted on the sleeve 42 and, specifically, the portion 54 thereof. The ring 78 has its interior diameter just slightly greater than the outer diameter of the sleeve 42 and, in connection with the guide 74, serves to prevent skewing of the collar 70 on the sleeve.

The ring 78 also has opposed slots sized to pass about the bar stock elements 58.

Radially outwardly extending spokes 80 are secured to the ring 78 and support a hoop-like handle 82 whereby the collar, and thus the sleeve by reason of the former being keyed to the latter by the bar stock elements 58, may be rotated to cause rotation of the split nuts 62 relative to the rod 50 to provide for a fine axial adjustment of the length of the structure.

The semi-cylindrical struts 76 house tension springs 84 on opposite sides of the sleeve 42. As seen in FIGS. 2–4, inclusive, the left end of each bar stock element 58 is provided with an eyelet 86 for receipt of one end of the spring 58, while the opposite end of the spring is hooked as at 88 to be latched about the left-hand end of the respective semi-cylindrical strut 76. As a consequence of this construction, the collar 70 is urged toward the second connector 32, that is, toward the right in FIGS. 2 and 3.

As best seen in FIG. 4, the interior of the housing 72 is provided with a pair of cam and backing elements 90, one for each split nut 62. The edges 92 of each plate 90 are dimensioned to abut the sides of the bar stock elements 58 to provide a spline-like interaction. Intermediate the sides 92 is a backing surface 94 which is in substantial abutment with the radially outer surface 96 of the associated split nut to hold the same in firm threaded engagement with the threads 52 on the rod 50, as best illustrated in FIG. 5.

The forward edge of each plate 90 is provided with a wedge-like cam surface 100 which slopes from right to left from the internal diameter of the housing 72 to the backing surface 94. As can be appreciated from an inspection of FIG. 10, movement of the collar 70 to the right will cause the cam surface 100 to engage their respective ones of the split nuts 62 to cam the same radially inwardly within the openings 60 into threaded engagement with the rod 50.

Each plate 90 is also provided with a pair of side notches 102 having abutment surfaces 104 which are adapted to engage a side of the associated split nut 62 to prevent the collar 70 from moving past the solid line position illustrated in FIG. 2 relative to the sleeve 42 under the influence of the springs 84.

Opposed sides of the housing 72 are also provided with spaced cam lugs 110. The spacing is such that the bar stock elements 58 may pass therebetween. Each has a cam surface 112 which, as seen in FIG. 3, slopes inwardly towards the cylindrical axis of the structure from right to left.

As seen in various Figures, each of the split nuts 62, on both sides thereof, is provided with an outwardly extending cam lug 114, each of which has a cam surface 116 diagonally arranged to be complementary to the cam surfaces 112. Thus, if the collar 72 is moved to the left as viewed in FIGS. 2 and 3, such movement will move the cam surfaces 112 into engagement with the cam surfaces 116 to cause the split nuts 62 to be cammed radially outwardly and out of engagement with threaded rod 50.

It will be noted that the cam lugs 110 are so located on the collar 70 such that when the surfaces 112 engage the surfaces 116, the backing surface 94 of each plate 90 will already have been shifted out of overlying relation to the surface 96 on the associated split nut 62, as can be observed in FIG. 8.

The operation of the device is as follows. When it is desired to vary the length of the link, the collar 70 is manually shifted to the left, as viewed in FIGS. 2 and 3. The action of the cam surfaces 112 and 116 will cause the split nut 62 to be cammed radially outwardly out of threaded engagement with the rod 50 whereupon the same may be axially adjusted without rotation to rapidly achieve a coarse adjustment of the link to the desired length. When the desired length has been achieved, the collar 70 may be released, whereupon the springs 84 will return the same to the solid line position of FIG. 2. During such movement, the cam surfaces 100 will cam the split nuts 62 back into threaded engagement with the shaft 50 and the backing surfaces 94 will maintain the split nuts in such engagement. If fine adjustment is required, the handle 82 may then be rotated to complete the adjustment process.

It will be appreciated that the link may be readily disassembled for service. In general, the lubrication fitting 48 will prevent movement of the collar 70 to the left past the dotted line position, as viewed in FIG. 2, sufficiently such that the split nuts 62 will no longer be contained in the housing 72. This prevents disassembly. However, should disassembly for servicing be required, it is only necessary to remove the lubrication fitting 48 whereupon further leftward movement of the collar 70 necessary to expose the split nuts for removal can be achieved. Thus, the lubrication fitting 48 serves the dual function of providing a means whereby the thrust bearing can be lubricated, as well as a means for precluding inadvertent disassembly of the parts.

From the foregoing, it will be appreciated that a link made according to the invention may have its length rapidly adjusted to facilitate the changing of implements having differing dimensions between their points for attachment to a 3-point hitch.

It will also be appreciated that the rapid adjustment feature of a link made according to the invention will have substantial utility even where there is no difference in dimensions between the points of attachment in one or more implements. For example, at the end of a particular operation, a tractor operator may deposit a given implement in a particular location and disconnect the same from the tractor to enable the tractor to be used for other purposes. Subsequently, it may be desired to reattach the implement to the tractor. If the implement has not shifted from its original position in which it was disconnected, no adjustment need be effected. However, frequently, particularly where soil moisture conditions vary, over the period of disconnection, the implement may have settled and skewed in the process. Thus, to reconnect the implement to the tractor may require adjustment to the hitch in the normal situation and such adjustment is readily accomplished through the use of a link made according to the invention.

I claim:
1. For use in a 3-point hitch for a tractor or the like, wherein there is provided a top link of variable length and a pair of powered lift arms, the improvement wherein said top link includes an elongated threaded rod, means for securing the rod to one of a tractor or an implement or the like, a nut structure threaded on the rod, means for securing the nut structure to the other of a tractor or an implement, or the like, one of the nut structure and rod being split whereby relative radial movement between the rod and the nut structure may be effected to disengage the rod and the nut structure, and means for selectively precluding said relative radial movement, whereby said precluding means may be operated to permit relative radial movement, relative radial movement effected to disengage said rod and said nut structure relative axial movement rapidly effected without turning said nut structure on said rod until a desired length is attained, relative radial movement effected to re-engage said rod and said nut structure and said precluding means operated to preclude further relative radial movement to maintain said top link at said desired length, one of said securing means having a rotatable connection to the corresponding one of said rod and said nut structure on the longitudinal axis of said rod.

2. The top link of claim 1 wherein said nut structure includes a split nut having segments movable toward and away from said rod.

3. The top link of claim 1 further including means selectively operable to effect said relative radial movement.

4. An adjustable link for a 3-point hitch comprising:
an elongated tubular sleeve having a bore;
a first connector;
a thrust bearing rotatably securing said first connector to one end of said sleeve for rotation about the longitudinal axis of the sleeve;
an elongated, threaded rod having a second connector on one end and its other end slidably received in said bore;
at least one radially directed opening in said sleeve intermediate its ends and extending to said bore;
a threaded element disposed in said opening for radial movement therein between positions threadably engaged with and disengaged from said rod; and
a cam member mounted on said sleeve and movable to cam said threaded element between said positions.

5. An adjustable link for a 3-point hitch, comprising:
an elongated, tubular sleeve having a bore;
a first connector rotatably secured to one end of said sleeve to allow relative rotation about the longitudinal axis of said sleeve;
an elongated threaded rod having a second connector on one end and its other end slidably received in said bore;
at least one radially directed opening in said sleeve intermediate its ends and extending to said bore;

a threaded element disposed in said opening for radial movement therein between positions threadably engaged with and disengaged from said rod;

a collar mounted on said sleeve for reciprocal movement thereon;

a handle secured to said link whereby said sleeve may be selectively rotated relative to said first connector;

a first cam carried by said collar for engaging said threaded element to cam the same radially inwardly within said opening to rotatably engage said rod when said collar is moved in one direction to a first position on said sleeve;

a second cam on said collar for moving said threaded element radially outwardly within said opening to a position disengaged from said rod when said collar is moved in a direction opposite from said one direction to a second position on said sleeve; and means for biasing said collar toward said first position.

6. An adjustable link for a 3-point hitch, comprising: an elongated, tubular sleeve having a bore;

a first connector rotatably secured to one end of said sleeve to allow relative rotation about the longitudinal axis of said sleeve;

an elongated threaded rod having a second connector on one end and its other end slidably received in said bore;

at least one radially directed opening in said sleeve intermediate its ends and extending to said bore;

a threaded element disposed in said opening for radial movement therein between positions threadably engaged with and disengaged from said rod;

a collar mounted on said sleeve for reciprocal movement thereon;

a handle secured to said link whereby said sleeve may be selectively rotated relative to said first connector;

cam means carried by said collar for camming said threaded element radially inwardly within said opening to threadably engage said rod when said collar is moved to one position on said sleeve and for moving said threaded element radially outwardly within said opening to a position disengaged from said rod when said collar is moved to a second position on said sleeve; and means for biasing said collar toward said one position.

7. The adjustable link of claim 6 wherein said collar includes portions spaced from said sleeve sufficiently to allow said threaded element to move to said position disengaged from said rod and yet be housed within said collar, and further including a backing element carried by and within said collar for backing said threaded element when said collar is in said one position thereof to preclude radially outward movement of said threaded element from its position in threaded engagement with said rod.

8. An adjustable link for a 3-point hitch, comprising: an elongated, tubular sleeve having a bore; a first connector rotatably secured to one end of said sleeve; an elongated rod having a second connector on , one end and its other end slidably received in said bore, said rod having a plurality of latching formations along its length; at least one radially directed opening in said sleeve intermediate its ends and extending to said bore; a latching element disposed in said opening for radial movement therein between positions latchingly engaging with and disengaging from said rod; a collar mounted on said sleeve for reciprocal movement thereon; cam means carried by said collar for camming said latching element radially inwardly within said opening to threadably engage at least one of said latching formations when said collar is moved to one position on said sleeve and for moving said latching element radially outwardly within said opening to a position disengaged from said rod when said collar is moved to a second position on said sleeve; means for biasing said collar toward said one position; means for precluding relative rotation between said sleeve and said collar; a handle secured to said collar whereby said collar, and thus said sleeve, may be selectively rotated relative to said first connector; and a threaded connection between said connectors whereby rapid, coarse axial adjustment may be effected through operation of said cam means and fine axial adjustment may be effected by rotation of said handle.

9. A rapidly adjustable, elongated, extensible, telescoping, threaded structure having opposed ends including an elongated tubular sleeve having a bore and defining one of said opposed ends; an elongated, threaded rod having an end slidably received in said bore through an end of said sleeve and defining the other of said opposed ends; at least one radially directed opening in said sleeve intermediate its ends and extending to said bore; a threaded element disposed in said opening for radial movement therein between positions threadably engaged with and disengaged from said rod; a cam member mounted on said sleeve and movable to cam said threaded element between said positions; and a thrust bearing interposed between said opposed ends of said structure and having an axis of rotation generally parallel to the longitudinal axis of said structure; whereby rapid adjustment of the length of said structure can be obtained by disengaging said threaded element from said rod and sliding the rod within said sleeve and incremental adjustment can be obtained by engaging said threaded element with said rod and effecting relative rotation between said sleeve and said rod.

10. The structure of claim 9 wherein said thrust bearing is located on said sleeve at the end thereof opposite said rod.

11. A rapidly adjustable, elongated link for a 3-point hitch including an elongated tubular sleeve having a bore; a first connector at one end of said sleeve; an elongated, threaded rod having an end slidably receiving in said bore through the other end of said sleeve; a second connector at the other end of said rod; at least one radially directed opening in said sleeve intermediate its ends and extending to said bore; a threaded element disposed in said opening for radial movement therein between positions threadably engaged with and disengaged from said rod; a cam member mounted on said sleeve and movable to cam said threaded element between said positions; and a thrust bearing interposed between one of said tubular sleeve and said first connector, and said threaded rod and said second connector and having an axis of rotation generally parallel to the longitudinal axis of said link; whereby rapid adjustment of the length of said link can be obtained by disengaging said threaded element from said rod and sliding the rod within said sleeve and incremental adjustment can be obtained by engaging said threaded element with said rod and effecting relative rotation between said sleeve and said rod.

* * * * *